(12) United States Patent
Kapoor et al.

(10) Patent No.: US 12,519,769 B2
(45) Date of Patent: Jan. 6, 2026

(54) MODIFYING AN IDENTITY TOKEN BASED ON A TRUSTED SERVICE

(71) Applicant: Cryptography Research, Inc., Sunnyvale, CA (US)

(72) Inventors: Amit Kapoor, San Francisco, CA (US); Yogesh Kumar Gowdra Vemadevappa, Sunnyvale, CA (US)

(73) Assignee: Cryptography Research, Inc., San Jose, CA (US)

( * ) Notice: Subject to any disclaimer, the term of this patent is extended or adjusted under 35 U.S.C. 154(b) by 557 days.

(21) Appl. No.: 16/446,063

(22) Filed: Jun. 19, 2019

(65) Prior Publication Data

US 2020/0067913 A1    Feb. 27, 2020

Related U.S. Application Data

(60) Provisional application No. 62/721,405, filed on Aug. 22, 2018.

(51) Int. Cl.
*H04L 29/06*    (2006.01)
*H04L 9/40*     (2022.01)

(52) U.S. Cl.
CPC ...... *H04L 63/0823* (2013.01); *H04L 63/0853* (2013.01); *H04L 63/102* (2013.01)

(58) Field of Classification Search
CPC .................. H04L 63/0823; H04L 63/0853; H04L 63/102
See application file for complete search history.

(56) References Cited

U.S. PATENT DOCUMENTS

| | | | |
|---|---|---|---|
| 7,428,750 B1 * | 9/2008 | Dunn .................. | G06F 21/41 726/8 |
| 7,607,008 B2 | 10/2009 | Howard | |
| 8,522,323 B1 * | 8/2013 | Zubovsky ............. | H04L 63/126 713/192 |
| 8,627,424 B1 * | 1/2014 | O'Malley ........... | H04L 63/0838 370/254 |
| 8,627,437 B2 | 1/2014 | Dietrich | |
| 9,398,004 B2 | 7/2016 | Dietrich et al. | |
| 9,461,990 B2 | 10/2016 | Dietrich | |
| 2008/0178271 A1 * | 7/2008 | Gajjala ................. | H04L 9/3213 726/6 |
| 2011/0239283 A1 * | 9/2011 | Chern .................. | H04L 9/3213 726/6 |
| 2013/0191884 A1 * | 7/2013 | Leicher ................. | H04L 63/08 726/4 |

(Continued)

OTHER PUBLICATIONS

Brian Carrier et al., The Session Token Protocol for Forensics and Traceback, Aug. 1, 2004, ACM, vol. 7, Issue 3, pp. 333-362. (Year: 2004).*

(Continued)

*Primary Examiner* — Luu T Pham
*Assistant Examiner* — Fahimeh Mohammadi
(74) *Attorney, Agent, or Firm* — Lowenstein Sandler LLP

(57) ABSTRACT

An identity token may be received and a service associated with the identity token may be identified. A request may be provided to the service based on the identity token. In response to providing the request, additional information from the service associated with the identity token may be received. The identity token may be modified with the additional information.

14 Claims, 5 Drawing Sheets

(56) References Cited

U.S. PATENT DOCUMENTS

| | | | | |
|---|---|---|---|---|
| 2014/0082715 A1* | 3/2014 | Grajek | ............... | H04W 12/068 |
| | | | | 726/8 |
| 2015/0100788 A1* | 4/2015 | Chastain | ............ | H04L 63/0853 |
| | | | | 713/168 |
| 2015/0237041 A1* | 8/2015 | Flamini | .............. | H04L 63/0823 |
| | | | | 726/10 |
| 2016/0285843 A1* | 9/2016 | Popovich | ............ | H04L 63/0815 |
| 2016/0352717 A1* | 12/2016 | Shewchuk | .......... | H04L 63/0853 |
| 2017/0250967 A1* | 8/2017 | Martineau | ............ | H04L 63/061 |
| 2017/0374060 A1* | 12/2017 | Flamini | .............. | H04L 63/0823 |
| 2018/0302479 A1* | 10/2018 | Kolbe | .................... | H04L 12/66 |
| 2018/0367526 A1* | 12/2018 | Huang | ................. | H04L 9/3297 |
| 2019/0188696 A1* | 6/2019 | Carpenter | ............. | G06Q 20/36 |

OTHER PUBLICATIONS

Bian Yang et al., Towards Standardizing Trusted Evidence of Identity, Nov. 8, 2013, ACM, pp. 63-72. (Year: 2013).*

Azeem Ahmad et al., A Multi-Token Authorization Strategy for Secure Mobile Cloud Computing, Jun. 16, 2014, IEEE. pp. 136-141. (Year: 2014).*

Lawrence O'Gorman, Comparing Passwords, Tokens, and Biometrics for User Authentication, Dec. 31, 2003, IEEE, vol. 91, Issue: 12, pp. 2021-2040. (Year: 2003).*

* cited by examiner

MODIFYING AN IDENTITY TOKEN BASED ON A TRUSTED SERVICE

RELATED APPLICATION

This application claims the benefit under 35 U.S.C. § 119(e) of U.S. Provisional Application 62/721,405 filed on Aug. 22, 2018, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
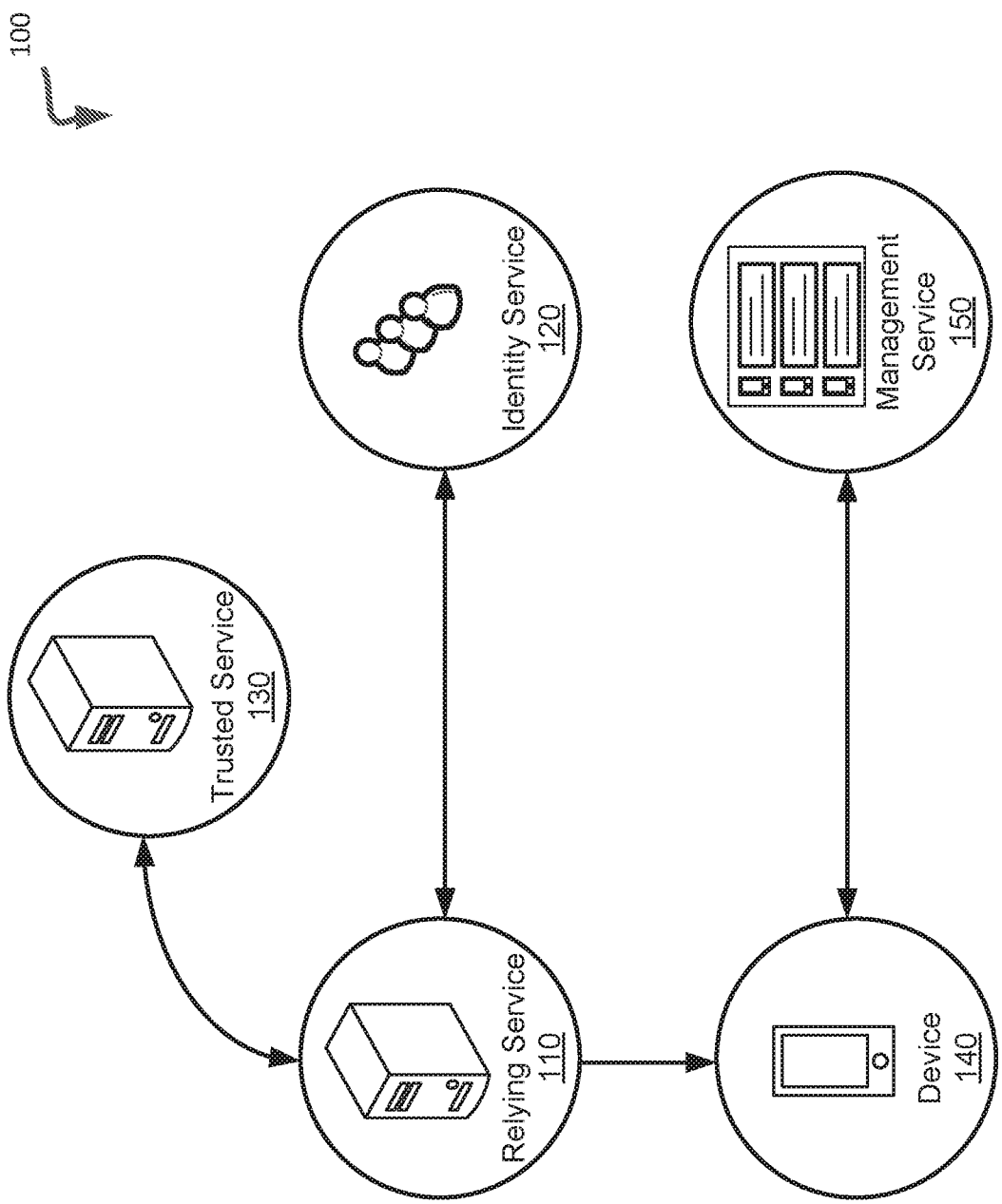
FIG. 1 illustrates an example environment to modify an identity token based on an external trusted service in accordance with some embodiments of the present disclosure.

Aspects of the present disclosure are directed to modifying an identity token based on a trusted service. An identity token may be used to provide identity information of an entity. For example, the identity token may be used to identify a user or a device that is to use a service. The identity token may be issued or provided by an identity service. The identity token may be provided to a relying party. The relying party may be, for example, a server that provides the service that is to be accessed by the user or the device. As such, the identity service may issue the identity token to the relying party so that a user or a device may use another service. The entity proving its identity or being authenticated is sometimes referred to as a Principal. A Principal can be a computer program, human end user, computer system, mobile device, or any entity that needs to prove its identity to another entity.

The identity token may specify information of the user or device that is to use the service. For example, the identity token may identify the user or the device, specify the identity service that has provided the identity token, the relying party for which the identity token has been provided, when the user or device was authenticated, an expiration time of the identity token, etc. The identity token may then be used by the relying party to provide the service to the user or the device.

As an example, the device may be an Internet of Things (IoT) device that is to interact with a management service provided by a server. For example, the management service may be used to identify various devices, provide a status of the various devices, and configure the devices. The identity token may be issued by the identity service to the relying service for the device to access the management service. However, additional information about the device may not be known by (e.g., may not be provided to or be accessible by) the identity service or the relying party. Instead, another entity may be aware of (e.g., have access to) additional information of the device. For example, a manufacturer of the device may operate a database that includes hardware characteristics, software characteristics, and other information of the device. Since the relying service is not aware of the additional information provided by the manufacturer, the additional information may also not be used in the management service that is provided for the device. Additionally, knowledge of the additional information is hidden between the identity service and the relying party. In some embodiments, information (e.g., metadata) associated with how to call or invoke the trusted service may be provided to the identity service and such information may be in the identity token.

Aspects of the present disclosure address the above and other deficiencies by modifying an identity token based on a trusted service. In some embodiments, the trusted service may be an external server that provides additional information of the device or the user for which an identity token is issued. The identity service may provide an identity token to the relying party. The identity token may include a reference to the trusted service. The reference may include an identification of a network location of the trusted service and one or more parameters (e.g., identification information from the identity token) to be used by the trusted service to provide the additional information. The relying party may transmit a request or issue a call to the trusted service based on the reference included in the identity token. The trusted service may transmit the additional information to the relying party and the relying party may subsequently modify the identity token with the additional information. The modified identity token may then be used to provide access to another service (e.g., the management service) by a user or device (e.g., an IoT device). For example, the identity of the user or device may be considered to be valid and the additional information may be used in the management service.

Advantages of the present disclosure include, but are not limited to, the use of additional information in real-time where the additional information is not accessible to the identity service. As such, the identity token that is provided by the identity service may be modified with additional information that is accessible to an external trusted service. The additional information for a particular user or device may change over time and the real-time requests or calls to the trusted service when an identity token is received by the relying party may reflect the new additional information that may subsequently be used by another service. As a result, a service that utilizes the identity token can use the additional information in the identity token to provide the additional information to a user of the service. Furthermore, since the identity token issued by the identity service includes a reference to the trusted service and the additional information that is returned by the trusted service may be of variable size, the contents of the identity token may be non-deterministic so that less content of the identity token (e.g., the reference to the trusted service) may be used and later replaced by the additional information that may be of variable sizes. As a result, fewer memory resources may be needed for such identity tokens and fewer processing resources may be used to store the identity tokens.

FIG. 1 illustrates an example environment 100 to an example environment to modify an identity token based on an external trusted service. The environment 100 may include servers that provide an identity service, a relying service, and a trusted service.

As shown in FIG. 1, the environment 100 may include an identity service 120, a relying service 110, and a trusted service 130. In some embodiments, each of the identity service 120, relying service 110, and trusted service 130 may be provided by a separate network server. In the same or alternative embodiments, the relying service 110 and the identity service 120 may be provided on a same network server. The relying service 110, identity service 120, and trusted service 130 may be used to provide a modified identity token that can be used to provide a device 140 access to the management service 150.

The identity service 120 may include records of multiple devices or users that are each associated with a different identity token. The relying service 110 may be provided by another network server and may provide authentication credentials or other such authentication information of a particular device or user to the identity service 120. In response to receiving the authentication credentials, the identity service 120 may issue a corresponding identity token to the relying service 110. The identity token may include a reference to the trusted service 130. In some embodiments, the reference may specify a network location of the network server providing the trusted service 130. The reference may further include one or more parameters to be used by the trusted service 130 when returning the additional information associated with the device 140. In response to receiving the identity token, the relying service 110 may transmit a request or a call over a network to the trusted service 130 for the additional information of the device 140. The request or the call may include a parameter that was specified in the reference to the trusted service 130. For example, the parameter may specify an identification information of the device 140.

Subsequently, the trusted service 130 may return or transmit additional information of the device 140 to the relying service 110 based on the one or more parameters of the device 140. In some embodiments, the trusted service 130 may search records to match the one or more parameters of the device. The records may include information about multiple devices. For example, a record for a particular device may identify physical resources of the device (e.g., a type of processor, integrated circuit chip, an amount of memory, a hardware operating state, or other such hardware resource in the device), software resources of the device (e.g., a firmware version operated by the device, an indication of data stored at the device, etc.), ownership or identity information, or any other information associated with the device. A record that matches the one or more parameters may specify the additional information of the device 140. In some embodiments, a subset of the additional information at a record of the device 140 may be transmitted to the relying service 110 based on a particular parameter that has been provided. For example, the reference included in the identity token may include a parameter that specifies that a particular hardware characteristic (e.g., an identification of integrated circuit chip identification) is to be returned by the trusted service 130 to the relying service 110 and that other information such as software characteristics are not to be returned by the trusted service 130.

As shown in FIG. 1, the relying service 110 may receive the additional information from the trusted service 130 and may modify the identity token based on the additional information. Further details with respect to modifying the identity token are described in conjunction with FIG. 3. The modified identity token may be used so that the device 140 may access the management service 150. In some embodiments, the management service 150 may be on the same network server as the relying service 110. In the same or alternative embodiments, the relying service 110 may be a software component of a network server that also provides the management service 150. The relying service 110 may provide data to the management service 150 based on the modified identity token as described with respect to FIG. 2.

The management service 150 may be a network server that provides a portal or graphical user interface to manage one or more devices. As an example, the management service may provide configuration information of the devices (e.g., the device 140) and may be utilized by a user to configure his or her devices. For example, the management service 150 may specify operating conditions or characteristics of the device 140. The management service 150 may provide or display the operating characteristics and the additional information of the device that was returned from the trusted service 130.

Figure 2:
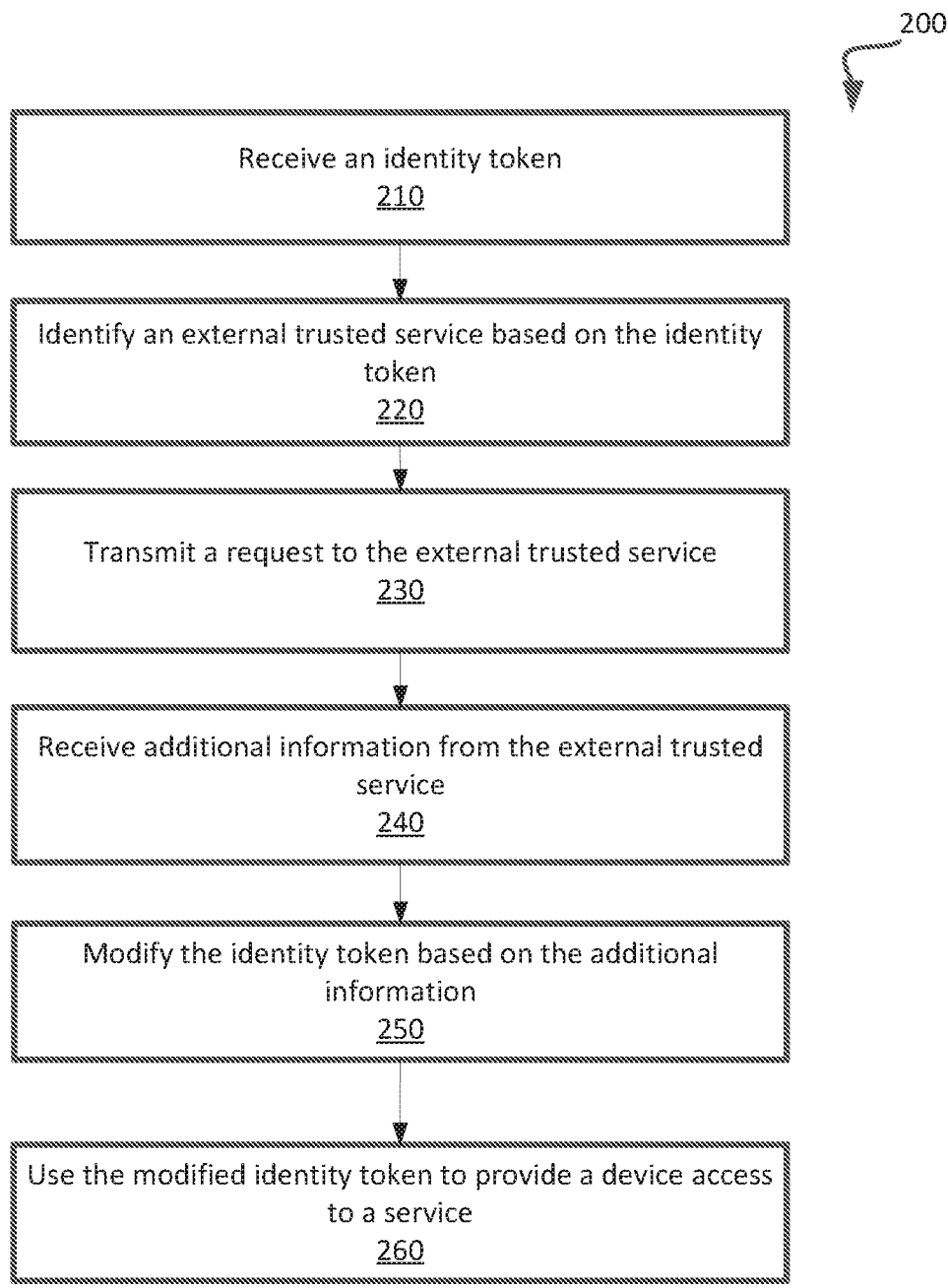
FIG. 2 is a flow diagram of an example method to modify and use an identity token based on a trusted service in accordance with some embodiments.

FIG. 2 is a flow diagram of an example method 200 to modify and use an identity token based on a trusted service. The method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the relying service 110 of a network server of FIG. 1.

As shown in FIG. 2, the method 200 may begin, at block 210, with the processing logic receiving an identity token. The identity token may be received from an identity service. The processing logic may further identify an external trusted service based on the identity token (block 220). For example, the identity token may include a reference to a network location of the external trusted service. In some embodiments, the reference may correspond to a uniform resource locator (URL) of the network location of the external trusted service. The reference may a particular line or lines of the identity token that specifies the reference. Further details with respect to the reference are described in conjunction with FIG. 3. The processing logic may further transmit a request to the external trusted service (block 230). For example, a request from a network server providing a relying service may be transmitted to another network server at the network location of the external trusted service. The request may specify particular information or an identity of a user or a device for which the identity token was issued. The processing logic may further receive additional information from the external trusted service (block 240). For example, the external trusted service may provide the additional information to the relying service in response to the request. The additional information may be data corresponding to the user or device for which the identity token has been issued.

Referring to FIG. 2, the processing logic may modify the identity token based on the additional information (block 250). For example, the identity token that was received from the identity service may be modified to include the additional information received from the external trusted service. In some embodiments, the additional information may replace the reference to the external trusted service that was previously included in the identity token. Further details with modifying the identity token are described in conjunction with FIG. 3. The processing logic may subsequently use the modified identity token to provide a device access to a service (block 260).

In some embodiments, the additional information modified into the identity token and other information that was present in the identity token before being modified may be provided to the service for display at a graphical user interface of the service. In the same or alternative embodiments, after the additional information has been modified into the identity token, a digital certificate may be issued or transmitted to the device. The digital certificate may be provided by the relying service that modified the identity token. In some embodiments, the digital certificate may include a signature (e.g., a signature based on the relying party or based on a combination of the relying party and the device). The relying party may further provide the signature to the service. When the device then attempts to connect with the service, the device may present the digital certificate and if the signature of the digital certificate matches with a known signature stored at the service, then the device may interact with the service. Otherwise, if the signature of the digital certificate does not match with a known signature stored at the service, then the device may not interact with the service.

Figure 3:
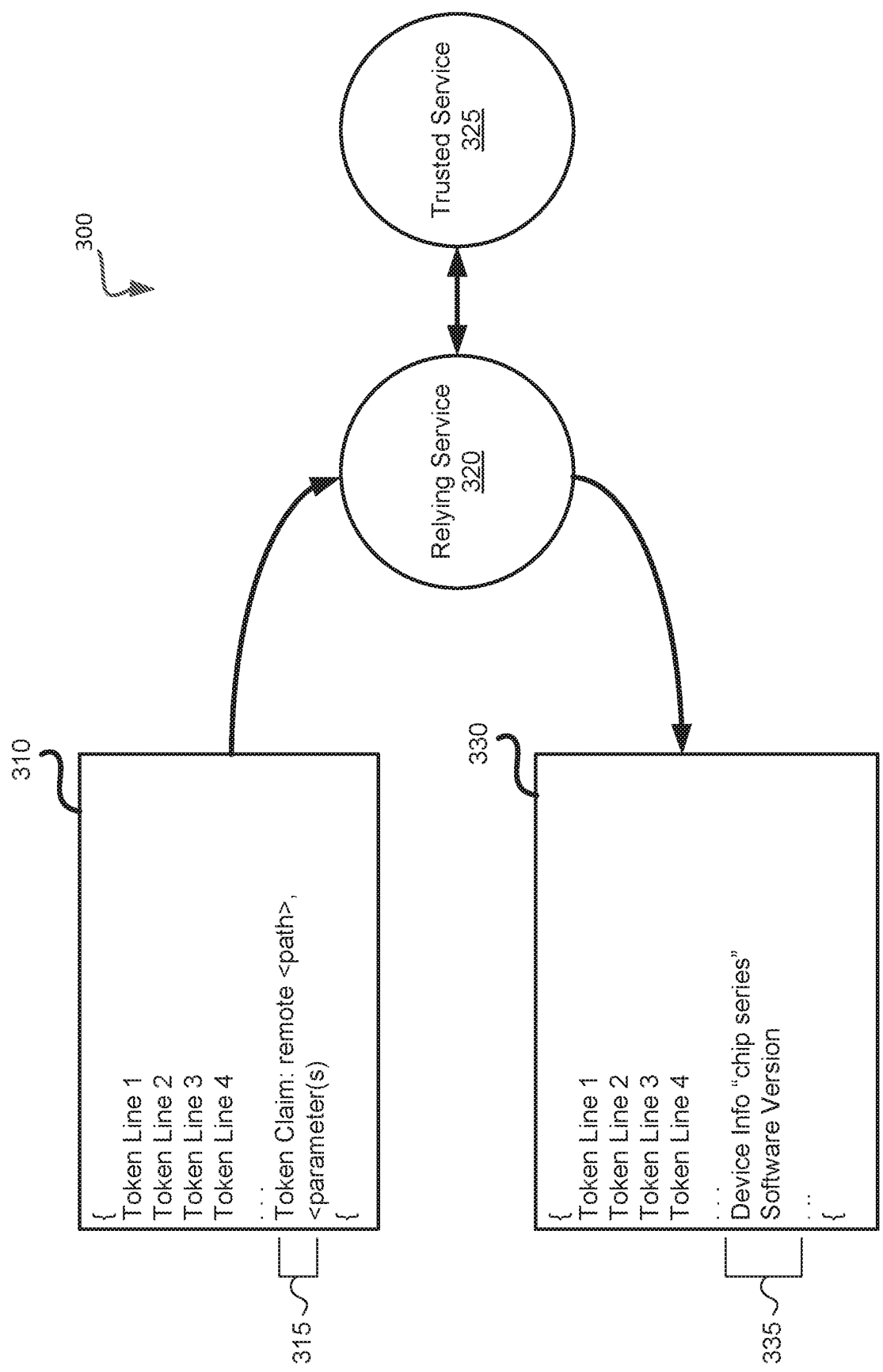
FIG. 3 illustrates the modification of an identity token in accordance with some embodiments of the present disclosure.

FIG. 3 illustrates the modification of an identity token 310. The identity 310 may be modified by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the relying service 320 of FIG. 1 may modify the identity token 310.

As shown in FIG. 3, an identity token 310 may be provided to the relying service 320. The identity token may include various lines or information that specify various characteristics of an entity (e.g., a user or a device) for which the identity token has been issued. The identity token 310 may further include a reference 315 that includes a network location (e.g., a path) of the trusted service 325 and may further include one or more parameters that are used by the trusted service 325 to return additional information of the entity. The relying service 320 may provide a request or a call to the trusted service 325 based on the reference 315 as previously described. The trusted service 325 may return the additional information to the relying service 320 and the relying service 320 may insert the additional information into the identity token 310 to generate the modified identity token 330. As shown, various characteristics returned by the trusted service 325 may be inserted into the identity token 330. For example, a hardware characteristic and a software characteristic may be inserted into the identity token 310. In some embodiments, the reference 315 may be replaced by the additional information 335 in the modified identity token 330.

Figure 4:
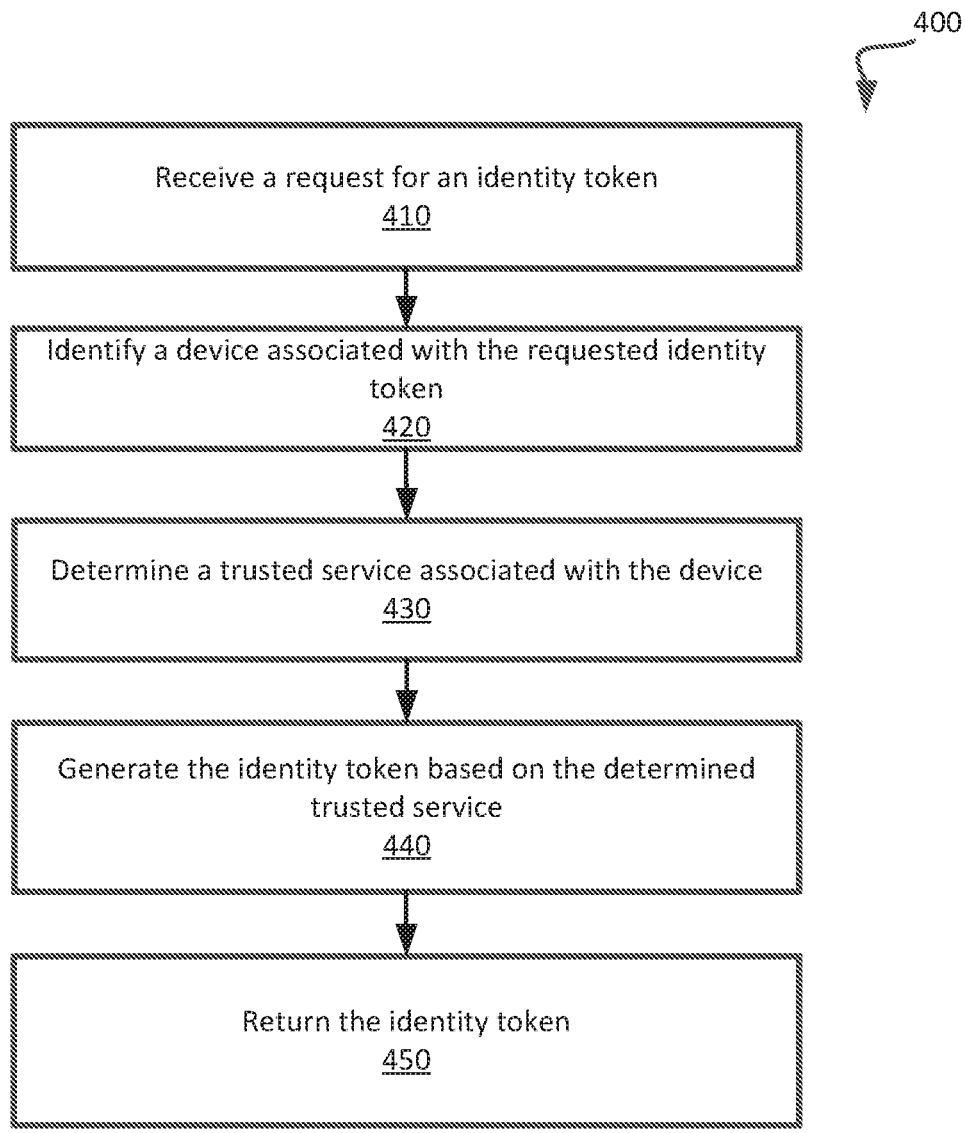
FIG. 4 is a flow diagram of an example method to modify an identity token based on a trusted service in accordance with some embodiments of the present disclosure.

FIG. 4 is a flow diagram of an example method 400 to modify an identity token based on a trusted service. The method 400 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the identity service 120 of a network server of FIG. 1.

As shown in FIG. 4, the method 400 may begin, at block 410, with the processing logic receiving a request for an identity token. In some embodiments, the request for the identity token may be received after an authentication of a user or device associated with the identity token. The processing logic may further identity a device associated with the requested identity token (block 420). For example, the identity token may be issued for a particular device that is identified from the request. The processing logic may further determine a trusted service associated with the device (block 430). For example, the identity service many identify a manufacturer or provider of the device. The identity service may store records of different manufacturers or providers of different devices. The processing logic may further generate the identity token based on the determined trusted service (block 440). For example, a reference to the determined trusted service may be included in the generated identity token. In some embodiments, the reference may be included at the end of the identity token. Subsequently, the processing logic may return the identity token (block 450). For example, the identity token may be returned to a relying service that provided the request for the identity token.

Figure 5:
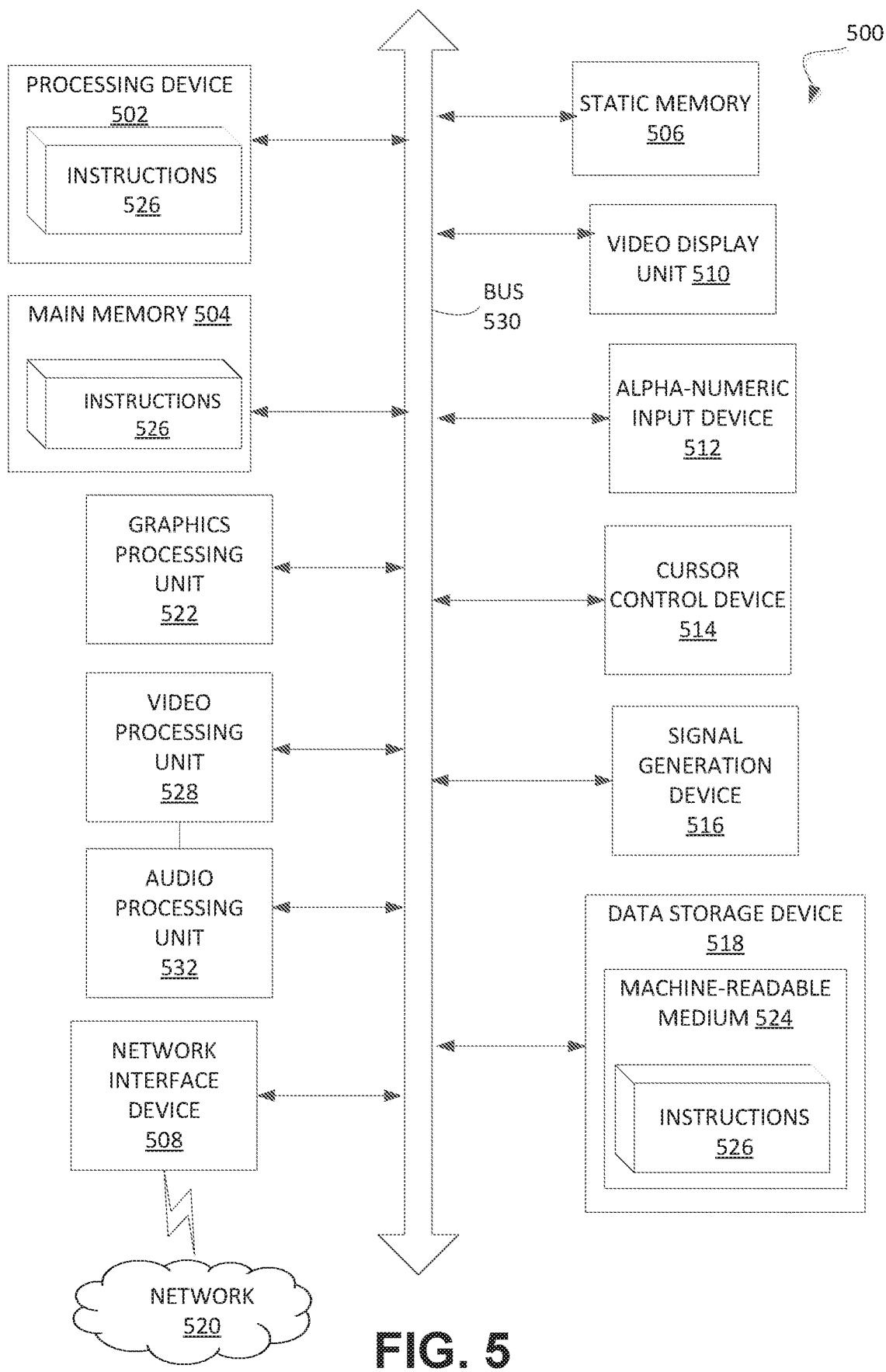
FIG. 5 illustrates a block diagram of an embodiment of a computer system in which some embodiments of the disclosure may operate.

FIG. 5 illustrates an example of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 614 (e.g., a mouse), a graphics processing unit 522, a signal generation device 516

(e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality as described herein. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, the present disclosure may refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving, by a processing device, an identity token from a first network server;
   identifying, by the processing device using information obtained from the identity token, a second network server that provides a first service;
   providing a request to the first service provided by the second network server based on the identity token;
   receiving, from the second network server, additional information from the first service associated with the identity token in response to providing the request;
   modifying, by the processing device, the identity token with the additional information to generate a modified identify token, wherein modifying the identity token comprises identifying a reference to the first service in the identity token and replacing the reference to the first service with the additional information received from the first service; and
   providing, to a device, the modified identity token for use in obtaining access to a second service.

2. The method of claim 1, wherein identifying the first service associated with the identity token comprises:
   identifying a reference to a network location of the first service that is specified in the identity token, wherein the request to the first service is transmitted to the network location.

3. The method of claim 1, wherein the additional information specifies a characteristic of a device associated with the identity token.

4. The method of claim 3, wherein the characteristic is associated with hardware or software of the device.

5. The method of claim 1, wherein the identity token is received from an identity service associated with the first network server and the request for the additional information is provided to the second network server.

6. A system comprising:
a memory; and
a processing device, operatively coupled with the memory, to:
  receive an identity token from a first network server;
  identify, using information obtained from the identity token, a second network server that provides a first service associated with the identity token;
  provide a request to the first service provided by the second network server based on the identity token;
  receive, from the second network server, additional information from the first service associated with the identity token in response to providing the request;
  modify the identity token with the additional information to generate a modified identify token, wherein to modify the identity token, the processing device is further to identify a reference to the first service in the identity token and replace the reference to the first service with the additional information received from the first service; and
  provide, to a device, the modified identity token for use in obtaining access to a second service provided.

7. The system of claim 6, wherein to identify the first service associated with the identity token, the processing device is further to:
  identify a reference to a network location of the first service that is specified in the identity token, wherein the request to the first service is transmitted to the network location.

8. The system of claim 6, wherein the additional information specifies a characteristic of a device associated with the identity token.

9. The system of claim 8, wherein the characteristic is associated with hardware or software of the device.

10. The system of claim 6, wherein the identity token is received from an identity service associated with the first network server and the request for the additional information is provided to the second network server.

11. A non-transitory computer readable medium comprising instructions that, when executed by a processing device, cause the processing device to perform operations comprising:
  receiving an identity token from a first network server;
  identifying, using information obtained from the identity token, a second network server that provides a first service associated with the identity token;
  providing a request to the first service provided by the second network server based on the identity token;
  receiving, from the second network server, additional information from the first service associated with the identity token in response to providing the request;
  modifying the identity token with the additional information to generate a modified identify token, wherein modifying the identity token comprises identifying a reference to the first service in the identity token and replacing the reference to the first service with the additional information received from the first service; and
  providing, to a device, the modified identity token for use in obtaining access to a second service provided.

12. The non-transitory computer readable medium of claim 11, wherein to identify the first service associated with the identity token, the operations further comprise:
  identifying a reference to a network location of the first service that is specified in the identity token, wherein the request to the first service is transmitted to the network location.

13. The non-transitory computer readable medium of claim 11, wherein the additional information specifies a hardware characteristic or a software characteristic of a device associated with the identity token.

14. The non-transitory computer readable medium of claim 11, wherein the identity token is received from an identity service associated with the first network server and the request for the additional information is provided to the second network server.

* * * * *